US008560834B2

(12) United States Patent
Lau (10) Patent No.: US 8,560,834 B2
(45) Date of Patent: *Oct. 15, 2013

(54) SYSTEM AND METHOD FOR CLIENT-SIDE AUTHENTICATION FOR SECURE INTERNET COMMUNICATIONS (75) Inventor: KaFai Lau, Redwood City, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,276

(22) Filed: Apr. 19, 2012

(65) Prior Publication Data

US 2012/0204025 A1 Aug. 9, 2012

Related U.S. Application Data (63) Continuation of application No. 11/468,273, filed on Aug. 29, 2006, now Pat. No. 8,181,227.

(51) Int. Cl.
H04L 29/06 (2006.01)

(52) U.S. Cl.
USPC ............. 713/151; 713/156; 713/175; 726/10; 726/12

(58) Field of Classification Search
USPC .......... 713/151, 155, 156, 175; 726/3, 10, 12, 726/11
See application file for complete search history.

(56) References Cited

U.S. PATENT DOCUMENTS

| 5,420,927 | A | * | 5/1995 | Micali | 713/157 |
| 5,604,804 | A | * | 2/1997 | Micali | 713/157 |
| 5,606,617 | A | * | 2/1997 | Brands | 380/30 |
| 5,872,847 | A | * | 2/1999 | Boyle et al. | 713/151 |
| 6,094,485 | A | * | 7/2000 | Weinstein et al. | 380/30 |
| 6,128,738 | A | * | 10/2000 | Doyle et al. | 713/185 |
| 6,438,550 | B1 | * | 8/2002 | Doyle et al. | 726/2 |
| 6,636,975 | B1 | * | 10/2003 | Khidekel et al. | 726/10 |
| 6,732,269 | B1 | * | 5/2004 | Baskey et al. | 713/153 |
| 6,748,528 | B1 | * | 6/2004 | Greenfield | 713/151 |
| 6,820,133 | B1 | | 11/2004 | Grove et al. | |
| 6,981,139 | B2 | * | 12/2005 | Enokida | 713/156 |
| 7,032,110 | B1 | * | 4/2006 | Su et al. | 713/156 |
| 7,059,516 | B2 | * | 6/2006 | Matsuyama et al. | 235/382 |
| 7,080,251 | B2 | * | 7/2006 | Fujishiro et al. | 713/171 |
| 7,127,607 | B1 | * | 10/2006 | Su et al. | 713/156 |
| 7,185,363 | B1 | * | 2/2007 | Narin et al. | 726/6 |
| 7,240,366 | B2 | * | 7/2007 | Buch et al. | 726/14 |
| 7,395,424 | B2 | * | 7/2008 | Ashley et al. | 713/156 |
| 7,506,368 | B1 | * | 3/2009 | Kersey et al. | 726/12 |
| 7,512,974 | B2 | * | 3/2009 | Callaghan et al. | 726/14 |
| 7,536,544 | B2 | * | 5/2009 | Xiao | 713/158 |
| 7,543,146 | B1 | * | 6/2009 | Karandikar et al. | 713/175 |

(Continued)

Primary Examiner — David García Cervetti
(74) Attorney, Agent, or Firm — Joshua T. Matt (57) ABSTRACT A system and method for client-side authentication for secure Internet communications is disclosed. In one embodiment, an intermediate device receives a web browser secure socket layer certificate from a web browser, authenticates the web browser using the secure socket layer certificate, and then re-signs the secure socket layer certificate with an intermediate device public key and an intermediate device certificate authority signature. The intermediate device sends the re-signed secure socket layer certificate to a web server and the web server authenticates the intermediate device using the re-signed secure socket layer certificate. In another embodiment, an intermediate device receives a web browser secure socket layer certificate from a web browser, inserts the web browser secure socket layer certificate into a HTTP header of a packet, and sends the packet to a web server.

20 Claims, 7 Drawing Sheets

(56) References Cited

U.S. PATENT DOCUMENTS

| | | | |
|---|---|---|---|
| 7,561,690 B2* | 7/2009 | Maurin et al. | 380/202 |
| 7,571,314 B2* | 8/2009 | Lortz | 713/157 |
| 7,594,107 B1* | 9/2009 | Parkhill | 713/156 |
| 7,610,487 B2* | 10/2009 | Aura et al. | 713/168 |
| 7,634,811 B1* | 12/2009 | Kienzle et al. | 726/22 |
| 7,660,296 B2* | 2/2010 | Fletcher et al. | 370/352 |
| 7,680,878 B2* | 3/2010 | Tsuchida et al. | 709/203 |
| 7,739,494 B1* | 6/2010 | McCorkendale et al. | 713/156 |
| 7,797,533 B2* | 9/2010 | Murakawa | 713/156 |
| 7,865,717 B2* | 1/2011 | Calcev et al. | 713/153 |
| 7,920,589 B2* | 4/2011 | Le Pennec et al. | 370/466 |
| 8,086,859 B2* | 12/2011 | Pavlicic | 713/176 |
| 8,135,022 B2* | 3/2012 | Sterman et al. | 370/401 |
| 8,213,408 B1* | 7/2012 | Thomas et al. | 370/351 |
| 8,261,062 B2* | 9/2012 | Aura et al. | 713/162 |
| 8,307,421 B2* | 11/2012 | Buch et al. | 726/14 |
| 2001/0011255 A1* | 8/2001 | Asay et al. | 705/76 |
| 2002/0040431 A1* | 4/2002 | Kato et al. | 713/168 |
| 2002/0069361 A1* | 6/2002 | Watanabe et al. | 713/185 |
| 2002/0108041 A1* | 8/2002 | Watanabe et al. | 713/175 |
| 2002/0108042 A1* | 8/2002 | Oka et al. | 713/175 |
| 2002/0133700 A1* | 9/2002 | Maurin et al. | 713/156 |
| 2002/0152382 A1* | 10/2002 | Xiao | 713/173 |
| 2003/0074555 A1* | 4/2003 | Fahn et al. | 713/156 |
| 2003/0115342 A1* | 6/2003 | Lortz | 709/229 |
| 2003/0130947 A1* | 7/2003 | Benantar | 705/44 |
| 2003/0163700 A1* | 8/2003 | Paatero | 713/175 |
| 2003/0217165 A1* | 11/2003 | Buch et al. | 709/229 |
| 2004/0015725 A1* | 1/2004 | Boneh et al. | 713/201 |
| 2004/0083359 A1* | 4/2004 | Camus et al. | 713/156 |
| 2004/0111375 A1* | 6/2004 | Johnson | 705/64 |
| 2004/0161110 A1* | 8/2004 | Kanai et al. | 380/279 |
| 2004/0165603 A1* | 8/2004 | D'Angelo et al. | 370/401 |
| 2004/0236965 A1* | 11/2004 | Krohn | 713/201 |
| 2004/0255113 A1* | 12/2004 | Ogura | 713/156 |
| 2005/0005097 A1* | 1/2005 | Murakawa | 713/156 |
| 2005/0015594 A1* | 1/2005 | Ashley et al. | 713/168 |
| 2005/0033957 A1* | 2/2005 | Enokida | 713/156 |
| 2005/0154886 A1* | 7/2005 | Birk et al. | 713/168 |
| 2005/0160259 A1* | 7/2005 | Ogura et al. | 713/156 |
| 2005/0188220 A1* | 8/2005 | Nilsson et al. | 713/201 |
| 2005/0289084 A1* | 12/2005 | Thayer et al. | 705/67 |
| 2006/0020784 A1* | 1/2006 | Jonker et al. | 713/157 |
| 2006/0031492 A1* | 2/2006 | Thayer et al. | 709/225 |
| 2006/0143442 A1* | 6/2006 | Smith | 713/156 |
| 2006/0200857 A1* | 9/2006 | Yokota | 726/6 |
| 2006/0264202 A1* | 11/2006 | Hagmeier et al. | 455/411 |
| 2006/0265740 A1* | 11/2006 | Clark et al. | 726/8 |
| 2006/0294366 A1* | 12/2006 | Nadalin et al. | 713/156 |
| 2007/0055893 A1* | 3/2007 | Dodd | 713/193 |
| 2007/0074282 A1* | 3/2007 | Black et al. | 726/14 |
| 2009/0013399 A1* | 1/2009 | Cottrell et al. | 726/12 |
| 2009/0287935 A1* | 11/2009 | Aull et al. | 713/182 |

* cited by examiner

SYSTEM AND METHOD FOR CLIENT-SIDE AUTHENTICATION FOR SECURE INTERNET COMMUNICATIONS

This application is a continuation of U.S. application Ser. No. 11/468,273, filed Aug. 29, 2006, (now issued as U.S. Pat. No. 8,181,227) the contents of which are hereby incorporated by reference.

FIELD OF THE INVENTION

This invention relates generally to electronic networks and relates more particularly to a system and method for client-side authentication for secure Internet communications.

BACKGROUND

A common technique for enabling secure communications over the Internet is to establish a secure communication link using the secure socket layer (SSL) protocol. The SSL protocol is an integral part of most web browsers and web servers, and uses a public key-private key pair encryption system for authentication. The SSL protocol requires that a web server be authenticated to a web browser. SSL connections between web browsers and web servers involve sending content encrypted using a symmetric session key, where both the web browser and the web server use the same session key to encrypt and decrypt content. A common example involving secure communications is on-line shopping, where a web browser will encrypt data including a shopper's credit card information before sending the data to the on-line store's web server.

To establish an SSL connection between two Internet devices, one device may request an SSL certificate, typically an X.509 digital certificate, from the other device during a process known as an SSL "handshake." A server device typically must present its certificate during the SSL handshake but a client device only presents its certificate upon request from a server device. The SSL certificate typically includes an identifier of the device, a public key, and a certificate authority signature. The certificate authority signature is generally issued by an independent and trusted third-party certificate authority to ensure the validity of the certificate; however, some certificate authority signatures are self-issued by an entity operating an Internet device. The certificate authority signature provides assurance to the device wishing to send encrypted data that the destination device can be trusted with the data. The device that will be sending encrypted data will use the public key from the SSL certificate of the intended destination to authenticate the destination. Authentication is a process by which the intended destination proves that it is indeed the device it is representing itself to be and that it can be trusted with the data. After authentication, a symmetric session key is established during the SSL handshake such that the device that will be sending the encrypted data will encrypt the data using the session key and the destination will decrypt the data using the same session key.

Authenticating a destination device to receive encrypted data becomes a problem when the path between the devices includes a proxy or other intermediate device. For example, a web browser may be communicating with a web server through a proxy for that web server. Typically, the web browser establishes a TCP connection with the proxy and the proxy establishes a separate TCP connection with the web server. If the web browser will be sending encrypted data to the web server, the proxy for the web server must send an SSL certificate to the web browser during an SSL handshake. The proxy's SSL certificate is typically the same as the web server's SSL certificate. The web browser then can authenticate the proxy and establish an SSL connection with the proxy. The proxy must have the private key that matches the public key in the SSL certificate of the web server, and the proxy typically does have this private key.

In some instances, the web browser needs to be authenticated to the web server. During an SSL handshake between the web browser and the proxy, the proxy requests the web browser's SSL certificate and the web browser sends its SSL certificate to the proxy. The proxy then forwards the web browser's SSL certificate to the web server to authenticate itself during an SSL handshake between the proxy and the web server. However, since the proxy does not posses the web browser's private key (the web browser's SSL certificate only includes the public key), it cannot authenticate the web browser to the web server, i.e., the authentication process fails. Thus, there is a need for authenticating one Internet device to another Internet device when one Internet device will be sending encrypted content through an intermediate device that does not posses the private key of the intended destination of the encrypted content.

SUMMARY

Systems and methods for client-side authentication for secure Internet communications are disclosed. In one embodiment, an intermediate device receives a web browser secure socket layer certificate from a web browser, authenticates the web browser using the secure socket layer certificate, and then re-signs the secure socket layer certificate with an intermediate device public key and an intermediate device certificate authority signature. The intermediate device sends the re-signed secure socket layer certificate to a web server and the web server authenticates the intermediate device using the re-signed secure socket layer certificate.

In another embodiment, an intermediate device receives a web browser secure socket layer certificate from a web browser, inserts the web browser secure socket layer certificate or information extracted from the secure socket layer certificate into an HTTP header of a packet, and sends the packet to a web server.

In another embodiment, a client-side intermediate device receives a web browser secure socket layer certificate from a web browser and authenticates the web browser using the web browser secure socket layer certificate. The client-side intermediate device then strips a web browser public key and a web browser certificate authority signature from the web browser secure socket layer certificate and sends the stripped certificate to a server-side intermediate device. The server-side intermediate device re-signs the stripped certificate using a server-side intermediate device public key and a server-side intermediate device certificate authority signature. The server-side intermediate device then sends the re-signed certificate to a web server.

In another embodiment, a client-side intermediate device receives a web browser secure socket layer certificate from a web browser and authenticates the web browser using the web browser secure socket layer certificate. The client-side intermediate device then sends the web browser secure socket layer certificate or information extracted from the secure socket layer certificate to a server-side intermediate device. The server-side intermediate device inserts the web browser secure socket layer certificate or extracted information into a HTTP header of a packet and sends the packet to a web server.

DETAILED DESCRIPTION OF THE INVENTION

Figure 1A:
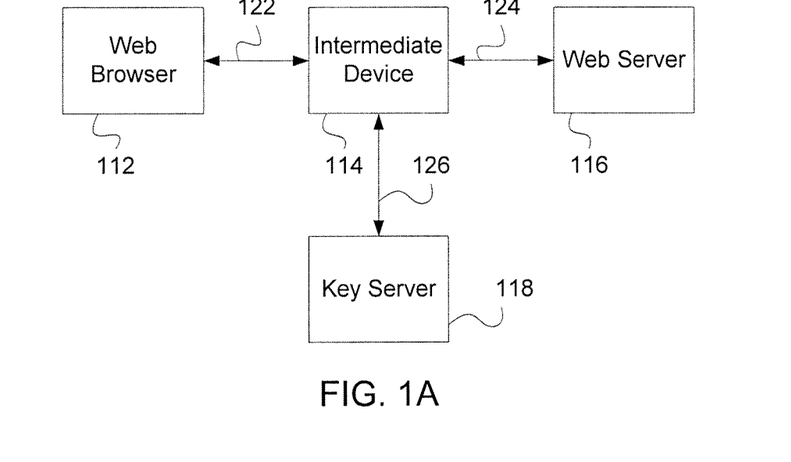
FIG. 1A is a block diagram of one embodiment of a computer network, according to the invention.

FIG. 1A is a block diagram of one embodiment of a computer network, according to the invention. A web browser 112 communicates over a link 122 with an intermediate device 114. Web browser 112 is resident on a client computer, which is typically a personal computer. Intermediate device 114 communicates with a web server 116 over a link 124 and communicates with a key server 118 over a link 126. Links 122, 124, and 126 are communication pathways within a local-area network (LAN) or a wide-area network (WAN), such as the Internet, and may include various connections with devices such as routers, bridges, and switches (not shown). In the FIG. 1A embodiment, intermediate device 114 operates as a proxy for web server 116, such that any communications from web browser 112 intended for web server 116 will be received by intermediate device 114 and web browser 112 communicates with intermediate device 114 as if it is communicating directly with web server 116. Intermediate device 114 is an endpoint for transmission control protocol (TCP) connections and SSL connections with web browser 112 and is an endpoint for TCP connections and SSL connections with web server 116.

Figure 1B:
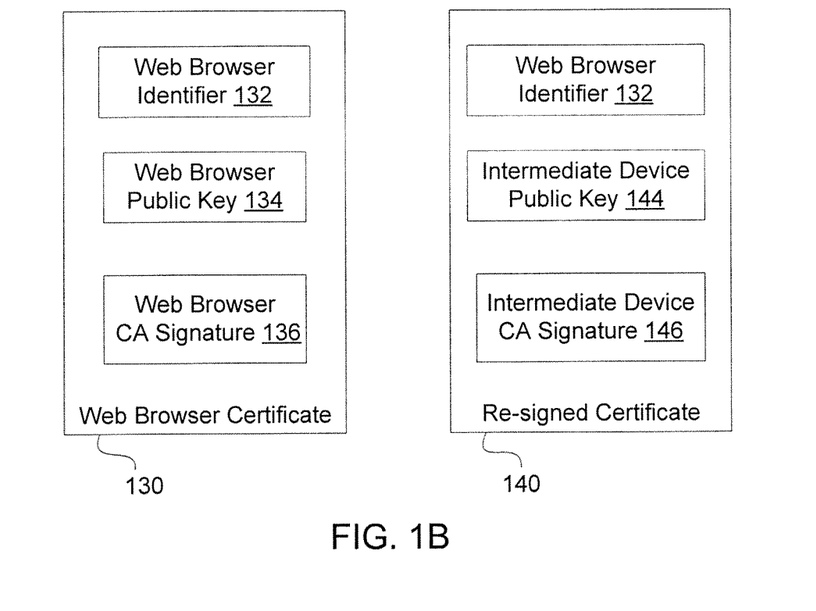
FIG. 1B is a diagram of one embodiment of a web browser certificate and a re-signed certificate, according to the invention.

If web browser 112 needs to be authenticated to web server 116, intermediate device 114 will request an SSL certificate from web browser 112 during an SSL handshake. When web browser 112 receives the certificate request, web browser 112 sends its certificate, typically an X.509 digital certificate, to intermediate device 114. FIG. 1B shows one embodiment of a web browser certificate 130 that includes, but is not limited to, a web browser identifier 132, a web browser public key 134, and a web browser certificate authority (CA) signature 136. Web browser public key 134 is part of a public key-private key pair associated with web browser 112. Web browser CA signature 136 is a signature from a certificate authority that intermediate device 114 and web server 116 will typically accept as a trusted authority.

Intermediate device 114 authenticates web browser 112 using web browser certificate 130 including checking whether web browser CA signature 136 is present and valid. In one embodiment, intermediate device 114 creates a re-signed certificate. FIG. 1B shows one embodiment of a re-signed certificate 140 that includes, but is not limited to, web browser identifier 132, an intermediate device public key 144, and an intermediate device CA signature 146. To create re-signed certificate 140, intermediate device 114 strips web browser public key 134 and web browser CA signature 136 from web browser certificate 130 and replaces them with intermediate device public key 144 and intermediate device CA signature 146. Intermediate device public key 144 is the public key that is part of a public key-private key pair associated with intermediate device 114. The public key-private key pair may be generated by intermediate device 114 or by key server 118. Intermediate device CA signature 146 is a signature from a certificate authority that web server 116 has been configured to accept as a trusted authority. The certificate authority may be unique to intermediate device 114 or may be any commercial certificate authority, such as VeriSign™ or Thawte.™ In one embodiment, intermediate device 114 may generate intermediate device CA signature 146. In a more secure embodiment, intermediate device 114 receives intermediate device CA signature 146 from key server 118.

Intermediate device 114 sends re-signed certificate 140 to web server 116 in response to a certificate request during an SSL handshake with web server 116. Web server 116 authenticates intermediate device 114 using re-signed certificate 140 by checking that intermediate device CA signature 146 is present and valid. Web server 116 may also perform an authorization routine using re-signed certificate 140, which includes web browser identifier 132, to determine if web browser 112 is authorized to receive the requested content. Web server 116 will use a session key established during the SSL handshake with intermediate device 114 to encrypt content intended for web browser 112. Intermediate device 114 receives the encrypted content from web server 116 and decrypts it using the session key. Intermediate device 114 then re-encrypts the content using a different session key established during the SSL handshake with web browser 112 and sends the re-encrypted content to web browser 112. Web browser 112 decrypts the encrypted content using the session key. Intermediate device 114 maintains the SSL connection to web browser 112 and the SSL connection with web server 116 until either web browser 112 or web server 116 terminates its connection to intermediate device 114.

Figure 2A:
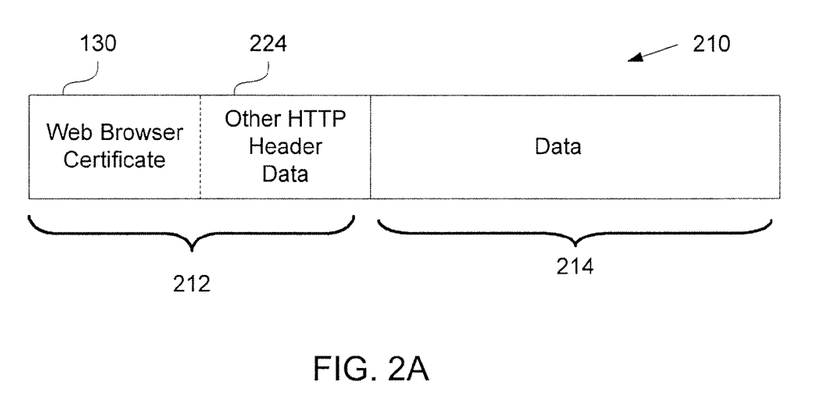
FIG. 2A is a diagram of one embodiment of an HTTP packet with a web browser certificate embedded in the HTTP header, according to the invention.

In another embodiment, when intermediate device 114 receives web browser certificate 130 during the SSL handshake with web browser 112, intermediate device 114 inserts web browser certificate 130 into the header of an HTTP packet that will be sent to web server 116. FIG. 2A shows an HTTP packet 210 with web browser certificate 130 embedded in an HTTP header 212. HTTP packet 210 also includes other HTTP header data 224 and data in a data field 214. Intermediate device 114 sends packet 210 to web server 116 over a previously established SSL connection. During the SSL handshake for this SSL connection, intermediate device 114 sent web server 116 a certificate including an identifier of intermediate device 114, intermediate device public key 144 and intermediate device CA signature 146. In this embodiment, web server 116 is configured to recognize packet 210 as having web browser certificate 130 embedded therein, and configured to view the contents of web browser certificate 130 from HTTP header 212. Web server 116 then authenticates web browser 112 using web browser certificate 130, for example by checking if web browser certificate 130 is on a certificate revocation list, but web server 116 does not use web browser public key 132 during the authentication since intermediate device 114 does not have the corresponding private key. Web server 116 may also use web browser certificate 130 to authorize web browser 112. Web server 116 uses a session key established during the SSL handshake with intermediate device 114 to encrypt content intended for web browser 112 and sends the encrypted content to intermediate device 114. Intermediate device 114 decrypts the content and then re-encrypts the content using the session key established during the SSL handshake with web browser 112. Web browser 112 then decrypts the content using the session key.

Figure 2B:
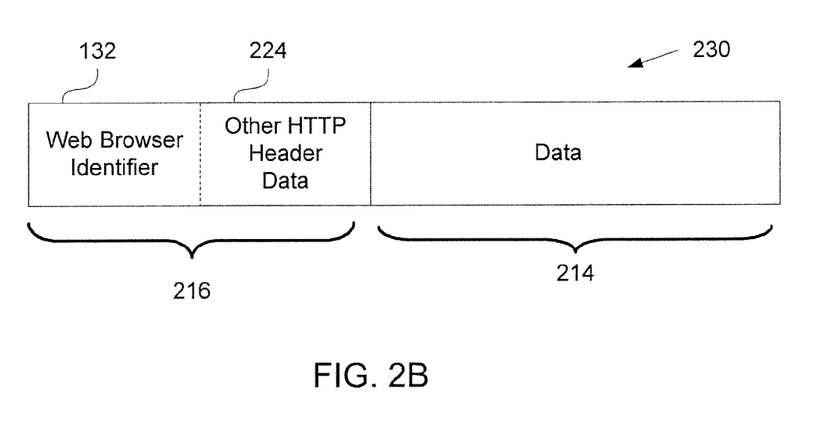
FIG. 2B is a diagram of one embodiment of an HTTP packet with a web browser identifier embedded in the HTTP header, according to the invention.

In another embodiment, when intermediate device 114 receives web browser certificate 130 during the SSL handshake with web browser 112, intermediate device 114 removes some information from web browser certificate 130, for example web browser identifier 132, and inserts that information into the header of an HTTP packet that will be sent to web server 116. FIG. 2B shows a packet 230 with web browser identifier 132 embedded in a HTTP header 216. Intermediate device 114 sends packet 230 to web server 116 over a previously established SSL connection. During the SSL handshake for this SSL connection, intermediate device 114 sent web server 116 a certificate including an identifier of intermediate device 114, intermediate device public key 144 and intermediate device CA signature 146. In this embodiment, web server 116 is configured to recognize packet 230 as having web browser identifier 132 embedded therein, and configured to view the contents of web browser identifier 132 from HTTP header 212. In this embodiment, web server 116 uses web browser identifier 132 to identify the intended recipient of content and optionally to determine if web browser 112 is authorized to receive the content, relying on a certificate from intermediate device 114 received during the SSL handshake that established the SSL connection between intermediate device 114 and web server 116 to authenticate the intended recipient of the content.

Figure 3A:
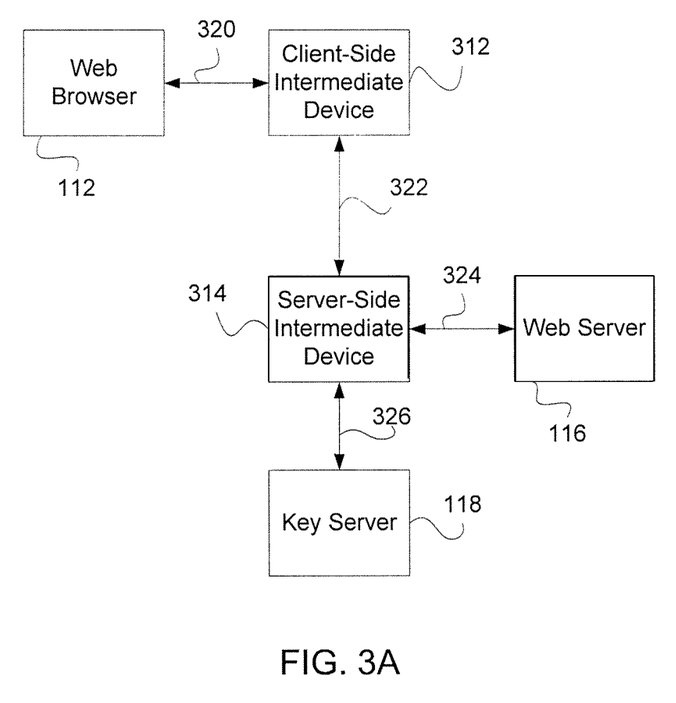
FIG. 3A is a block diagram of another embodiment of a computer network, according to the invention.

FIG. 3A is a block diagram of another embodiment of a computer network, according to the invention. Web browser 112 communicates over a link 320 with a client-side intermediate device 312, which communicates with a server-side intermediate device 314 over a link 322. Server-side intermediate device 314 communicates over a link 324 with web server 116 and over a link 326 with key server 118. Links 320, 322, 324, and 326 are communication pathways within a local-area network (LAN) or a wide-area network (WAN), such as the Internet, and may include various connections with devices such as routers, bridges, and switches (not shown). In the FIG. 3A embodiment, client-side intermediate device 312 and server-side intermediate device 314 collectively operate as a proxy for web server 116, such that any communications from web browser 112 intended for web server 116 will be received by client-side intermediate device 312 and web browser 112 operates as if it is communicating directly with web server 116. In one embodiment, client-side intermediate device 312 and server-side intermediate device 314 communicate with each other using a high-performance internode protocol that is not supported by either web browser 112 or web server 116, and client-side intermediate device 312 is an embodiment of a C-node and server-side intermediate device 314 is an embodiment of an S-node as disclosed in U.S. Pat. No. 6,820,133, the subject matter of which is hereby incorporated by reference in its entirety.

Figure 3B:
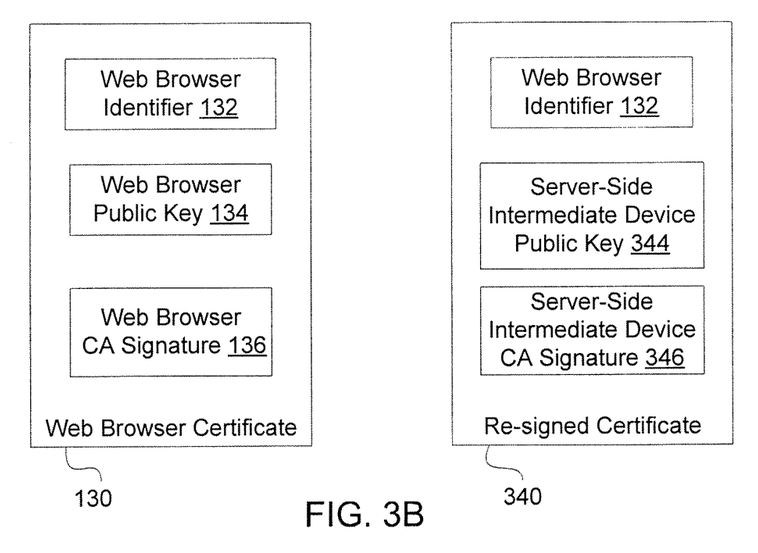
FIG. 3B is a diagram of one embodiment of a web browser certificate and a re-signed certificate, according to the invention.

If web browser 112 needs to be authenticated to web server 116, client-side intermediate device 312 will request an SSL certificate from web browser 112 during an SSL handshake. When web browser 112 receives the certificate request, web browser 112 sends its certificate to client-side intermediate device 312. FIG. 3B shows web browser certificate 130, which is identical to web browser certificate 130 of FIG. 1B. Client-side intermediate device 312 authenticates web browser 112 using web browser certificate 130, completes the SSL handshake with web browser 112, and then removes web browser public key 134 and web browser CA signature 136 from web browser certificate 130 and sends the stripped certificate to server-side intermediate device 314 over a separate SSL connection. Server-side intermediate device 314 receives the stripped certificate and creates a re-signed certificate 340, as shown in FIG. 3B. Re-signed certificate 340 includes, but is not limited to, web browser identifier 132, a server-side intermediate device public key 344, and a server-side intermediate device CA signature 346. Server-side intermediate device public key 344 is the public key that is part of a public key-private key pair associated with server-side intermediate device 314. The public key-private key pair may be generated by server-side intermediate device 314 or by key server 118. Server-side intermediate device CA signature 346 is a signature from a certificate authority that web server 116 has been configured to accept as a trusted authority. The certificate authority may be unique to server-side intermediate device 314 or may be any commercial certificate authority. In one embodiment, server-side intermediate device 314 may generate server-side intermediate device CA signature 346. In a more secure embodiment, server-side intermediate device 314 receives server-side intermediate device CA signature 346 from key server 118.

Server-side intermediate device 314 sends re-signed certificate 340 to web server 116 in response to a certificate request during an SSL handshake. Web server 116 authenticates server-side intermediate device 314 by checking that server-side intermediate device CA signature 346 is present and valid and completes the SSL handshake. Web server 116 will then use a session key established during the SSL handshake to encrypt content intended for web browser 112 and send the encrypted content to server-side intermediate device 314. Server-side intermediate device 314 decrypts the encrypted content and re-encrypts the content using a different session key for an SSL connection between server-side intermediate device 314 and client-side intermediate device 312. Client-side intermediate device 312 then decrypts the content, re-encrypts the content using a session key established during the SSL handshake with web browser 112, and sends the encrypted content to web browser 112.

In another embodiment, when client-side intermediate device 312 receives web browser certificate 130 during the SSL handshake with web browser 112, client-side intermediate device 312 sends web browser certificate 130 to server-side intermediate device 314. In one embodiment, client-side intermediate device 312 inserts web browser certificate 130 into an HTTP header of a packet and sends this packet to server-side intermediate device 314. Server-side intermediate device 314 receives web browser certificate 130 and then inserts web browser certificate 130 into the header of an HTTP packet that will be sent to web server 116. FIG. 2A shows an HTTP packet 210 with web browser certificate 130 embedded in HTTP header 212. HTTP packet 210 also includes other HTTP header data 224 and data in data field 214. Server-side intermediate device 314 sends packet 210 to web server 116 over a previously established SSL connection. During the SSL handshake for this SSL connection, server-side intermediate device 314 sent web server 116 a certificate including an identifier of server-side intermediate device 314, server-side intermediate device public key 344 and server-side intermediate device CA signature 346. In this embodiment, web server 116 is configured to recognize packet 210 as having web browser certificate 130 embedded therein, and configured to view the contents of web browser certificate 130 from HTTP header 212. Web server 116 then authenticates web browser 112 using web browser certificate 130, for example by checking if web browser certificate 130 is on a certificate revocation list, but web server 116 does not use web browser public key 132 during the authentication since server-side intermediate device 314 does not have the corresponding private key. Web server 116 may also use web browser certificate 130 to determine whether web browser 112 is authorized to receive particular content. Web server 116 uses a session key established during the SSL handshake with server-side intermediate device 314 to encrypt content intended for web browser 112 and sends the encrypted content to server-side intermediate device 314. Server-side intermediate device 314 decrypts the data, re-encrypts the data using a session key for an SSL connection with client-side intermediate device 312, and sends the encrypted content to client-side intermediate device 312. Client-side intermediate device 312 decrypts the data, re-encrypts the data using a session key established during the SSL handshake with web browser 112, and sends the encrypted content to web browser 112. Web browser 112 then decrypts the data using the session key.

In another embodiment, when client-side intermediate device 312 receives web browser certificate 130 during the SSL handshake with web browser 112, client-side intermediate device 312 removes some information from web browser certificate 130, for example web browser identifier 132, and sends the information to server-side intermediate device 314. In one embodiment, client-side intermediate device 312 inserts web browser identifier 132 into an HTTP header of a packet and sends this packet to server-side intermediate device 314. Server-side intermediate device 314 receives web browser identifier 132 and then inserts web browser identifier 132 into the header of an HTTP packet that will be sent to web server 116. FIG. 2B shows a packet 230 with web browser identifier 132 embedded in a HTTP header 216. Server-side intermediate device 314 sends packet 230 to web server 116 over a previously established SSL connection. During the SSL handshake for this SSL connection, server-side intermediate device 314 sent web server 116 a certificate including an identifier of server-side intermediate device 314, server-side intermediate device public key 344 and server-side intermediate device CA signature 346. In this embodiment, web server 116 is configured to recognize packet 230 as having web browser identifier 132 embedded therein, and configured to view the contents of web browser identifier 132 from HTTP header 212. In this embodiment, web server 116 uses web browser identifier 132 to identify the intended recipient of content and optionally to determine if web browser 112 is authorized to receive the content, relying on the certificate from server-side intermediate device 314 received during the SSL handshake that established the SSL connection between intermediate device 114 and web server 116 to authenticate the intended recipient of the content.

Figure 4:
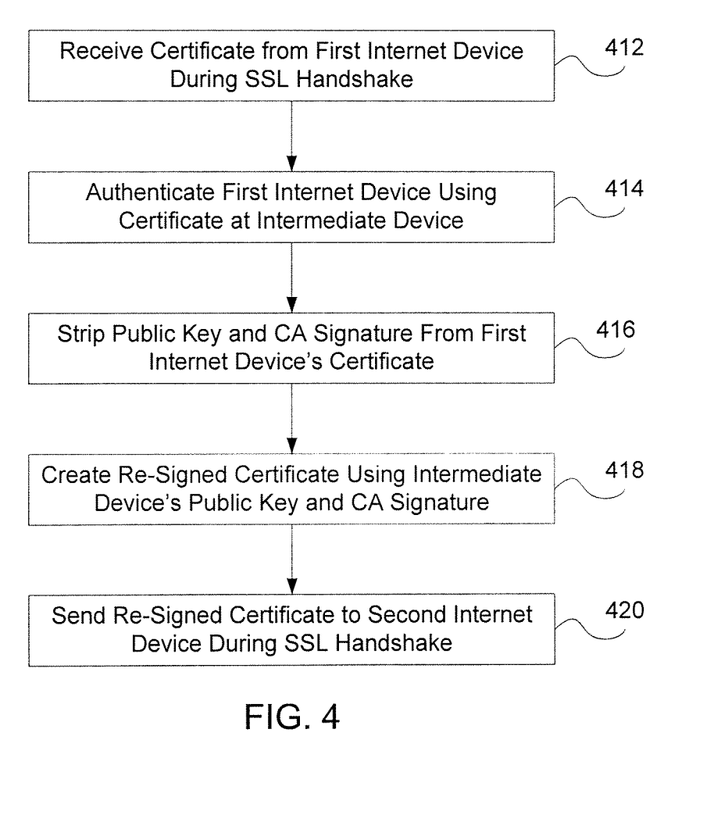
FIG. 4 is a flowchart of method steps for authenticating a first Internet device to a second Internet device through an intermediate device, according to one embodiment of the invention.

FIG. 4 is a flowchart of method steps for authenticating a first Internet device to a second Internet device through an intermediate device, according to one embodiment of the invention. In step 412, an intermediate device that operates as a proxy for a second Internet device receives a certificate from a first Internet device during an SSL handshake. In step 414, the intermediate device authenticates the first Internet device using the certificate, including verifying that a CA signature is present and valid. Then, in step 416, the intermediate device strips the public key and CA signature from the certificate. In step 418, the intermediate device creates a re-signed certificate by inserting an intermediate device public key and an intermediate device CA signature into the stripped certificate. In step 420, the intermediate device sends the re-signed certificate to the second Internet device during an SSL handshake. The second Internet device will then authenticate the first Internet device using the re-signed certificate. The second Internet device may also authorize the first Internet device to receive particular content.

Figure 5:
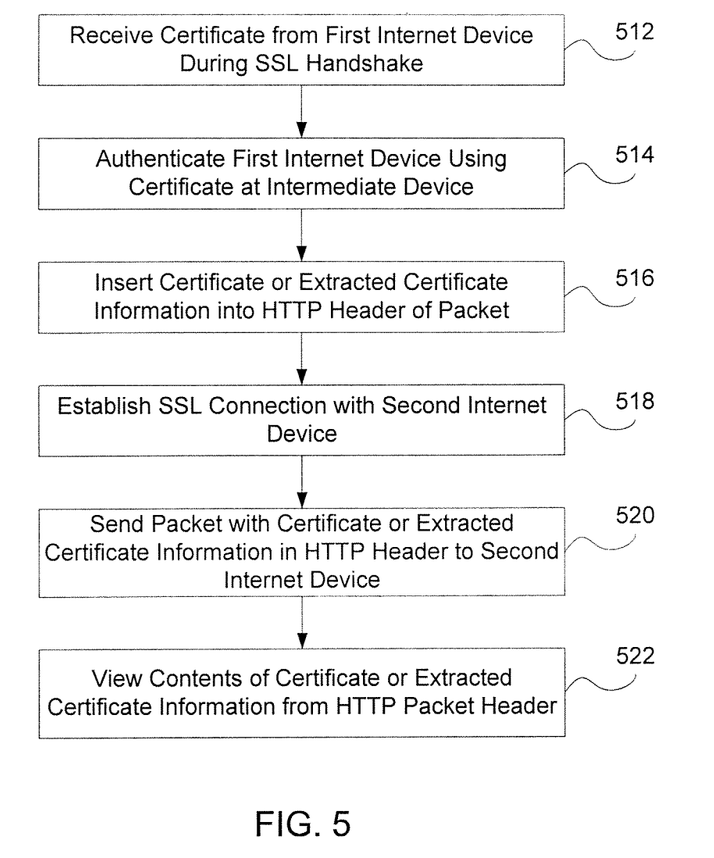
FIG. 5 is a flowchart of method steps for authenticating a first Internet device to a second Internet device through an intermediate device, according to another embodiment of the invention.

FIG. 5 is a flowchart of method steps for authenticating a first Internet device to a second Internet device through an intermediate device, according to another embodiment of the invention. In step 512, an intermediate device that operates as a proxy for a second Internet device receives a certificate from a first Internet device during an SSL handshake. In step 514, the intermediate device authenticates the first Internet device using the certificate, including verifying that a CA signature is present and valid. In step 516, the intermediate device inserts the certificate or information extracted from the certificate, including but not limited to a first Internet device identifier, into the HTTP header of a packet. In step 518, the intermediate device establishes an SSL connection with the second Internet device using an intermediate device certificate. In step 520, the intermediate device sends the packet that has the first Internet device's certificate or the extracted certificate information in the HTTP header to the second Internet device over the SSL connection. In step 522, the second Internet device views the contents of the certificate or the extracted certificate information from the HTTP packet header. The second Internet device may then authenticate the first Internet device using the certificate or may use the first Internet device identifier and optionally other extracted certificate information as an indicator of the intended recipient of encrypted content. The second Internet device must be configured to authenticate the first Internet device using the certificate from the HTTP packet header or configured to assume that the first Internet device has been authenticated by the intermediate device and to use the first Internet device identifier and optionally other extracted certificate information as an indicator of the final destination for encrypted content. The second Internet device may also authorize the first Internet device to receive particular content using the first Internet device's certificate or the extracted certificate information.

Figure 6:
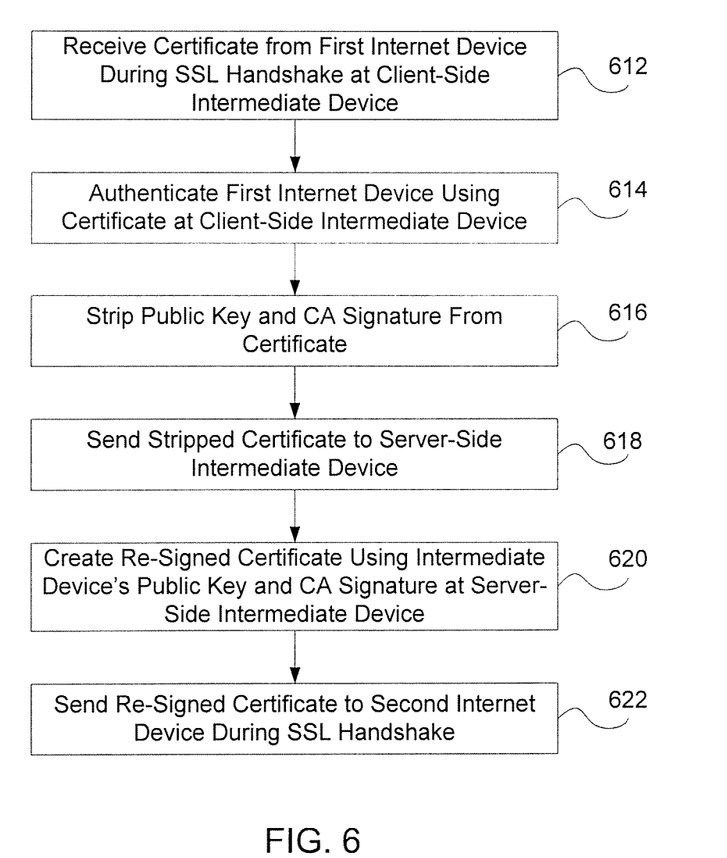
FIG. 6 is a flowchart of method steps for authenticating a first Internet device to a second Internet device through intermediate devices, according to another embodiment of the invention.

FIG. 6 is a flowchart of method steps for authenticating a first Internet device to a second Internet device through intermediate devices, according to another embodiment of the invention. In step 612, a client-side intermediate device receives a certificate from a first Internet device during an SSL handshake for an SSL connection. In step 614, the client-side intermediate device authenticates the first Internet device using the certificate. In step 616, the client-side intermediate device strips the public key and the CA signature from the certificate. Then, in step 618, the client-side intermediate device sends the stripped certificate to a server-side intermediate device. In step 620, the server-side intermediate device creates a re-signed certificate by inserting a server-side intermediate device public key and a server-side intermediate device CA signature into the stripped web browser certificate. In step 622, the server-side intermediate device sends the re-signed certificate to the second Internet device during an SSL handshake to establish an SSL connection.

Figure 7:
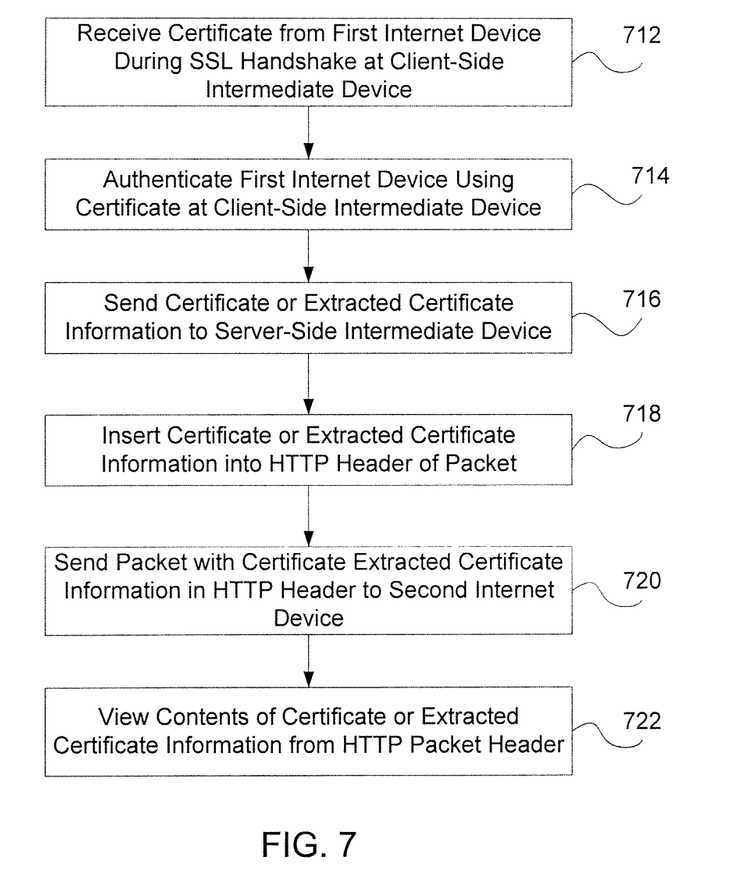
FIG. 7 is a flowchart of method steps for authenticating a first Internet device to a second Internet device through intermediate devices, according to another embodiment of the invention.

FIG. 7 is a flowchart of method steps for authenticating a first Internet device to a second Internet device through intermediate devices, according to another embodiment of the invention. In step 712, a client-side intermediate device receives a certificate from a first Internet device during an SSL handshake to establish an SSL connection. In step 714, the client-side intermediate device authenticates the first Internet device using the certificate. In step 716, the client-side intermediate device sends the certificate or information extracted from the certificate, including but not limited to a first Internet device identifier, to a server-side intermediate device. In step 718, the server-side intermediate device inserts the first Internet device's certificate or the extracted certificate information into the HTTP header of a packet. In step 720, the server-side intermediate device sends the packet with the certificate or the extracted certificate information in the HTTP header to a second Internet device. In step 722, the second Internet device views the contents of the certificate or the extracted certificate information from the HTTP header of the packet. The second Internet device may then authenticate the first Internet device using the certificate or may use the first Internet device identifier and optionally other extracted certificate information as an indicator of the intended recipient of encrypted content. The second Internet device must be configured to authenticate the first Internet device using the certificate from the HTTP packet header or configured to assume that the first Internet device has been authenticated by the client-side intermediate device and to use the first Internet device identifier as an indicator of the final destination for encrypted content. The second Internet device may also authorize the first Internet device to receive particular content using the first Internet device's certificate or the extracted certificate information.

In the methods of FIGS. 4-7, the first Internet device and the second Internet device may be any type of Internet device capable of establishing an SSL connection, including but not limited to a web browser, a web server, or a web server proxy.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for providing secure socket layer (SSL) communication between a client computer and a web server over at least one wide-area-network, the system comprising:
   a client-side intermediate computer communicatively coupled to a client computer over at least one wide-area-network;
   a server-side intermediate computer communicatively coupled to the client-side intermediate computer and to a web server over the at least one wide-area-network;
   the client-side intermediate computer programmed to receive an SSL certificate from the client computer using a first communication protocol and send the SSL certificate to the server-side intermediate computer using a second communication protocol that provides higher performance as compared to the first communication protocol;
   the server-side intermediate computer programmed to receive the SSL certificate from the first intermediate computer and to send the SSL certificate to the web server in a message header, using a third communication protocol;
   wherein the second communication protocol also provides higher performance as compared to the third communication protocol.

2. The system of claim 1, wherein the client-side intermediate computer is programmed to receive the SSL certificate from the client computer during an SSL handshake with the client computer.

3. The system of claim 1, wherein the server-side intermediate computer is programmed to send the message header with the SSL certificate to the web server over an SSL connection, the SSL connection having been established with an SSL handshake in which the server-side intermediate computer sent its SSL certificate to the web server.

4. The system of claim 1, wherein the web server is programmed to perform a client authentication or authorization routine using information from the SSL certificate.

5. The system of claim 1, wherein the message header is an HTTP header.

6. The system of claim 1, wherein the first and third communication protocols are the same.

7. The system of claim 1, wherein the client-side intermediate computer is programmed to insert the SSL certificate into a second message header, and to send the SSL certificate to the server-side intermediate computer second by sending the second message header to the server-side intermediate computer using the second communication protocol.

8. The system of claim 1, wherein each of the client-side intermediate computer and the server-side intermediate computers comprises a proxy server.

9. A method for providing secure socket layer (SSL) communication between a client computer and a web server over at least one wide-area-network, the method comprising:
   at a client-side intermediate computer, receiving an SSL certificate from a client computer using a first communication protocol, and sending the SSL certificate to a server-side intermediate computer using a second communication protocol that provides higher performance as compared to the first communication protocol;
   at the server-side intermediate computer, receiving the SSL certificate from the client-side intermediate computer, and sending the SSL certificate to a web server in a header, using a third communication protocol;
   wherein the second communication protocol also provides higher performance as compared to the third communication protocol.

10. A system for providing secure socket layer (SSL) communication between a client computer and a web server over at least one wide-area-network, the system comprising:
   a client-side intermediate computer communicatively coupled to a client computer over at least one wide-area-network;
   a server-side intermediate computer communicatively coupled to the client-side intermediate computer and to a web server over the at least one wide-area-network;
   the client-side intermediate computer programmed to receive an SSL certificate from the client computer using a first communication protocol, to remove information from the SSL certificate, and to send the information to the server-side intermediate computer using a second communication protocol that provides higher performance as compared to the first communication protocol;
   the server-side intermediate computer programmed to receive the information from the client-side intermediate computer and to send the information to the web server in a message header, using a third communication protocol;
   wherein the second communication protocol also provides higher performance as compared to the third communication protocol.

11. The system of claim 10, wherein the information comprises an identifier associated with any of: (i) the client computer and (ii) a web browser executing on the client computer.

12. The system of claim 10, wherein the client-side intermediate computer is programmed to receive the SSL certificate from the client computer during an SSL handshake with the client computer.

13. The system of claim 10, wherein the server-side intermediate computer is programmed to send the message header with the information to the web server over an SSL connection, the SSL connection having been established with an SSL handshake in which the server-side intermediate computer sent its SSL certificate to the web server.

14. The system of claim 10, wherein the web server is programmed to perform a client authentication or authorization routine using the information.

15. The system of claim 10, wherein the message header is an HTTP header.

16. The system of claim 10, wherein the first and third communication protocols are the same.

17. The system of claim 10, wherein the client-side intermediate computer is programmed to insert the information into a second message header, and to send the information to the server-side intermediate computer by sending the second message header to the server-side intermediate computer using the second communication protocol.

18. The system of claim 10, wherein each of the client-side intermediate computer and the server-side intermediate computers comprises a proxy server.

19. A method for providing secure socket layer (SSL) communication between a client computer and a web server over at least one wide-area-network, the method comprising:

at a client-side intermediate computer, receiving an SSL certificate from a client computer using a first communication protocol, removing information from the SSL certificate, and sending the information to a server-side intermediate computer using a second communication protocol that provides higher performance as compared to the first communication protocol;

at the server-side intermediate computer, receiving the information from the client-side intermediate computer, and sending the information to the web server in a message header, using a third communication protocol;

wherein the second communication protocol also provides higher performance as compared to the third communication protocol.

20. The method of claim 19, wherein the information comprises an identifier associated with any of: (i) the client computer and (ii) a web browser executing on the client computer.

* * * * *